United States Patent
Rae-Smith

(10) Patent No.: US 6,547,483 B2
(45) Date of Patent: *Apr. 15, 2003

(54) CLAMPING DEVICE FOR FORMWORK PANELS

(75) Inventor: Clifford John Rae-Smith, Loganholme (AU)

(73) Assignee: Concrete Form Hire Pty Ltd. (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,746
(22) PCT Filed: Nov. 25, 1997
(86) PCT No.: PCT/AU97/00795
§ 371 (c)(1),
(2), (4) Date: May 24, 1999
(87) PCT Pub. No.: WO98/23827
PCT Pub. Date: Jun. 4, 1998

(65) Prior Publication Data
US 2002/0021936 A1 Feb. 21, 2002

(30) Foreign Application Priority Data
Nov. 25, 1996 (AU) .............................. PO 3802

(51) Int. Cl.[7] .................................................. F16B 1/00
(52) U.S. Cl. ........................ 403/403; 403/230; 403/231
(58) Field of Search ............................... 403/230, 231,
403/403, 401, 402; 52/282.5, 714; 249/47, 194, 192, 189

(56) References Cited

U.S. PATENT DOCUMENTS

| 2,206,493 A | * | 7/1940 | Whatling | 249/194 |
| 2,742,776 A | * | 4/1956 | Peirce | 52/282.5 |
| 3,244,395 A | * | 4/1966 | Arrighini | 249/194 |
| 3,485,405 A | * | 12/1969 | Dement | 52/282.5 X |

FOREIGN PATENT DOCUMENTS

| AU | 25973 | 5/1931 | | |
| AU | 106255 | 1/1939 | | |
| AU | 110639 | 5/1940 | | |
| BE | 842.288 | 9/1976 | | |
| DE | 23 30 586 | 1/1975 | | |
| DE | 30 05 309 | 8/1981 | | |
| EP | 0 049 906 | 4/1982 | | |
| EP | 0 291 037 | 11/1988 | | |
| FR | 609268 | * | 8/1926 | 249/194 |
| FR | 2562178 | 10/1985 | | |
| GB | 288356 | * | 3/1928 | 249/194 |

* cited by examiner

Primary Examiner—Lynne H. Browne
Assistant Examiner—John R. Cottingham
(74) Attorney, Agent, or Firm—Brown, Martin, Haller & McClain LLP

(57) ABSTRACT

A clamping device to hold adjacent formwork panels has a backing plate against which edges of the adjacent formwork panels can be held, at least one rod extending from the backing plate, and a clamping member able to move along the rod between a clamping position where the member clamps the formwork panels against the backing plate, and a free position where the formwork panels can be removed.

8 Claims, 4 Drawing Sheets

CLAMPING DEVICE FOR FORMWORK PANELS

FIELD OF THE INVENTION

This invention relates to a clamping device for formwork, which is a temporary mould in which concrete, other settable materials, rammed earth and the like can be placed. The invention will be described with reference to concrete formwork, but other uses of the formwork are envisaged.

BACKGROUND ART

The function of formwork is to hold fluid concrete into the desired shape, to support fresh concrete until it is strong enough to be self-supporting, and to support temporary loading such as runways and machinery used to place the concrete.

Formwork should be simple to erect and dismantle. Only the minimum number of fasteners should be used. The formwork must remain straight and rigid when concrete is poured and therefore adequate bracing is essential to prevent movement caused by vibrators, concrete pumps and other machinery. The formwork should be tight to prevent loss of "fines". Any leaks can produce honeycombing or ridges on the finished concrete. Formwork should also be constructed such that maximum re-use is possible.

Formwork panels are made of wood boards, steel sheets, hard boards or resin bonded plywood. In order to allow the formwork to be made portable, the boards or sheets are relatively thin and therefore must be supported.

Formwork junctions must be able to support quite large forces and stresses, and the formwork must not warp, bow, or leak. Angled formwork, that is where adjacent formwork panels meet at an angle, require special consideration, and to date, complicated and unwieldy support devices are used to clamp formwork panels together at an angle. These existing devices are complicated to use, and readily become unusable should minimum contamination occur. That is, should small amounts of wet cement fall on to existing devices, the devices either cease to function or must be cleaned prior to use.

OBJECT OF THE INVENTION

It is an object of the invention to provide a clamping device to hold adjacent formwork panels, with the clamping device being simple, robust and easy to assemble and disassemble.

It is a further object of the invention to provide a clamping device for formwork panels which may overcome the above-mentioned disadvantages or provide the public with a useful or commercial choice.

In one form, the invention resides in a clamping device to hold adjacent formwork panels, the clamping device having a backing plate against which edges of the adjacent formwork panels can be held, at least one rod extending from the backing plate, and a clamping member able to move along the rod between a clamping position where the member clamps the formwork panels against the backing plate, and a free position where the formwork panels can be removed.

The above arrangement is-simple and can be used to clamp formwork panels to form corners of 90°, 45°, or any other angle, and can also be used, if desired, to clamp adjacent panels in a straight line.

The backing plate is suitably elongate and is preferably sufficiently long to enable the entire edge of a formwork panel to be held. The backing plate should be made of rigid material which does not bend or bow during a concrete pour. Thus, the backing plate is normally made of steel.

To allow adjacent formwork panels to be held by the backing plate, the backing plate typically has two opposed flanges, each flange able to support an edge area of a formwork panel. The opposed flanges can be angled relative to each other to form a corner of a desired angle.

Extending from the backing plate is at least one said rod on which the clamping member can be supported. If the backing plate is of sufficient length, a number of rods can be provided, the rods being spaced apart and along the backing member, the rods extending from the same side of the backing plate.

To provide a good, strong, secure connection between the rod and the backing plate, the rod can be attached to a boss or protrubance which itself is attached to the backing plate.

The rod can be releasably attached to the backing plate. In one form, the rod can be releasably attached to a mount which is attached to the backing plate. In a simple form, one end of the rod is bent, or has an angled portion which is held by a collar fastened to the backing plate.

If the rod is attached to a protrubance, the protrubance may have sides against which edges of the formwork abut. This arrangement can minimise movement of the formwork panels, and can also serve to align the formwork panels and the clamping device.

The rod may be formed from steel and may be solid or hollow. In a simple embodiment, the rod can be threaded to accommodate the clamping member.

The clamping member may comprise a clamping plate. The clamping plate may be formed from steel and may have an opening to allow it to freely slide along the rod. A clamping nut can be provided behind the clamping plate. The clamping nut may be, threadably attached to the rod such that rotation of the nut will cause the clamping plate to tightly clamp against the formwork panels. The nut or rod can be provided with means to prevent the nut from being totally removed from the rod such that the nut cannot inadvertently be lost. Of course, other forms of clamping nut equivalents can be used.

BRIEF DESCRIPTION OF THE DRAWINGS

Embodiments of the invention will be described with-reference to the following figures in which.

BEST MODE

Figure 1:
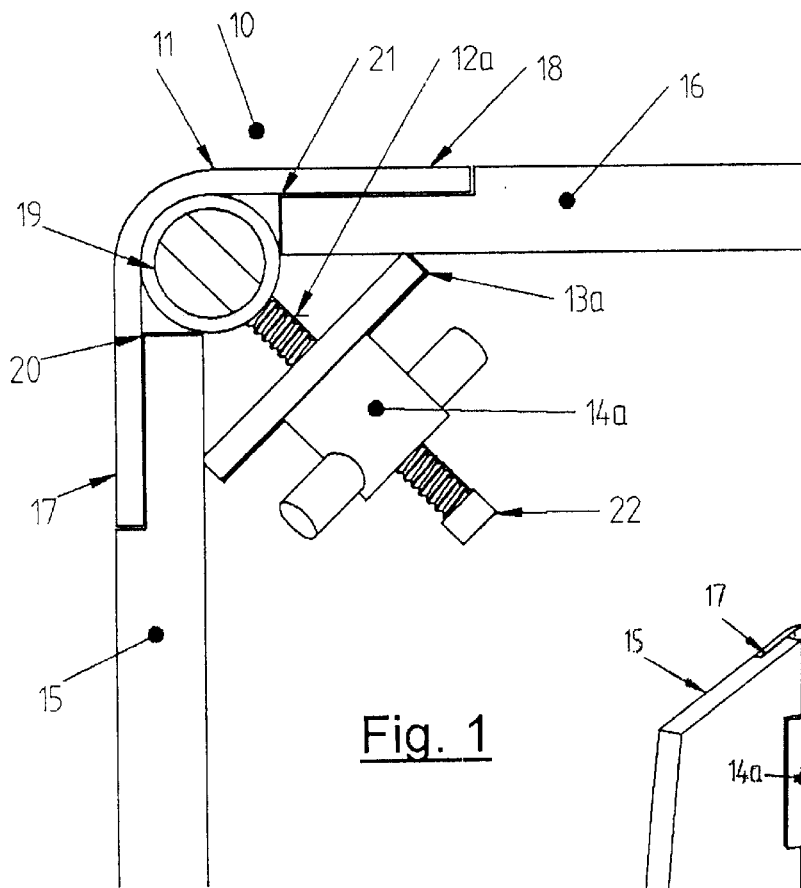
FIG. 1 is a plan view of a clamping device configured to form a right angle corner and where the rod is fixed to the backing plate.
Figure 2:
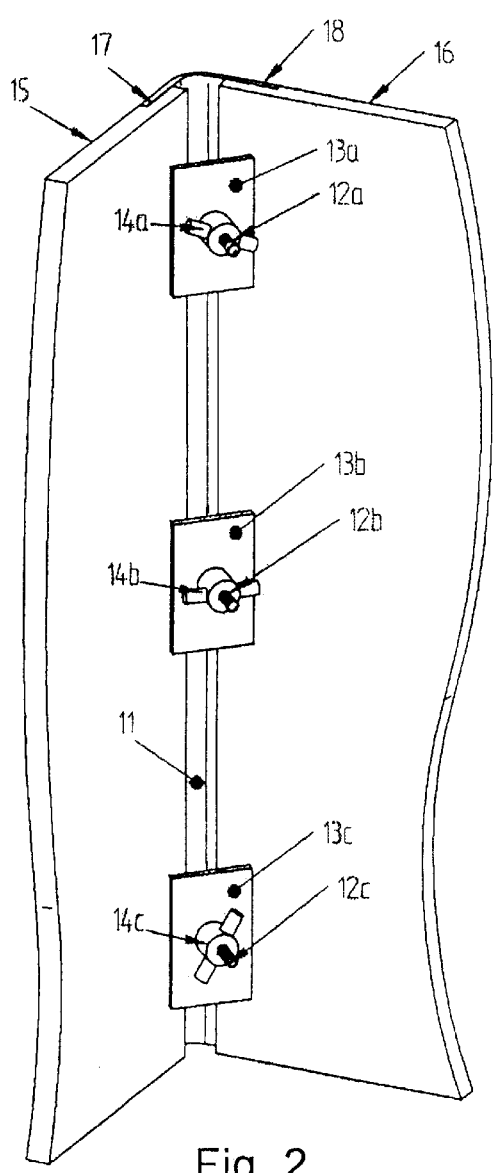
FIG. 2 is a side view of the clamping device of FIG. 1.

Referring to the drawings and initially to FIG. 1, there is shown a clamping device 10, which in this embodiment is of the type to form a 90° corner to formwork. Clamping device 10 has a backing plate 11, and a number of rods 12A–12C extend from the backing plate. Clamping device 10 further includes a clamping member which consists of a clamping plate 13A–13C and a clamping nut 14A–14C.

Backing plate 11 is formed from an elongate steel plate and has a length the same as the height of the formwork panels, 15, 16 which are to be clamped to the clamping device 10. In the embodiment, backing plate 11 is bent into 90° to define a pair of opposed flanges 17, 18. It should be appreciated however that backing plate 11 can be bent into other angles such as 45° and the like or may comprise a straight plate.

Flanges 17, 18 function to allow edges of panels 15, 16 to abut against the flanges. The edges of panels 15, 16 may be rebated as illustrated to provide a flush corner for the concrete pour.

In the embodiment described, the clamping device has three extending rods 12A–12C, but more or less rods can be provided depending upon the strength of the backing plate, the length of the backing plate, the force required to be held back by the clamping device and the like. Each rod 12A–12C are secured to backing plate 11 via separate protrubances 19 which in the embodiment are formed from short lengths of steel pipe. Protrubance 19 is welded or otherwise fixed to backing plate 11 and has a bore extending therethrough through which a respective rod 12A can extend. Rod 12A is welded or otherwise fixed to protrubance 19 such that rod 12A is firmly attached to the backing plate. Protrubance 19 does not extend entirely along the backing plate but instead is formed from a number of short lengths, each length allowing a respective rod 12A–12C to be fixed to the backing plate.

As illustrated in FIG. 1, protrubance 19 includes a pair of abutting sidewalls 20, 21 against which the edge of panels 15, 16 abut. This arrangement may facilitate correct alignment and positioning of panels 15, 16 to the clamping device.

Rod 12A is threaded, and clamping nut 14A is threadingly engaged to rod 12A. Clamping nut 14A is big enough to allow it to be manipulated by a person's hand, or be struck by a hammer, although if desired, a spanner can also be used. Clamping nuts 14A–14C force clamping plates 13A–13C into and out of clamping engagement against panels 15, 16. The clamping plates 13A–13C in the embodiment are formed from rectangular plates of steel being sufficiently sized to allow it to firmly clamp against panels 15, 16.

In use, each clamping nut 14A–14C is rotated to adjacent the free end of the respective threaded rod 12A–12C. Formwork panels 15, 16 can then be readily inserted or removed and it can be seen that formwork panels of various thickness' can also be used. Once the formwork panels are in position, nuts 14A–14C are rotated to force clamping plates 13A–13C against the formwork panels 15, 16 to securely and tightly clamp the panels against backing plate 11.

The simplicity of the design is such that should concrete inadvertently spill on the clamping device, the device would still work efficiently.

To prevent clamping nuts 14A–14C from becoming lost, a stop member 22 is provided. Stop member 22 is on the threaded rod 12A–12C and in a simple form, the end of the threaded rod can be deformed to prevent the nuts from being removed.

Figure 3A:
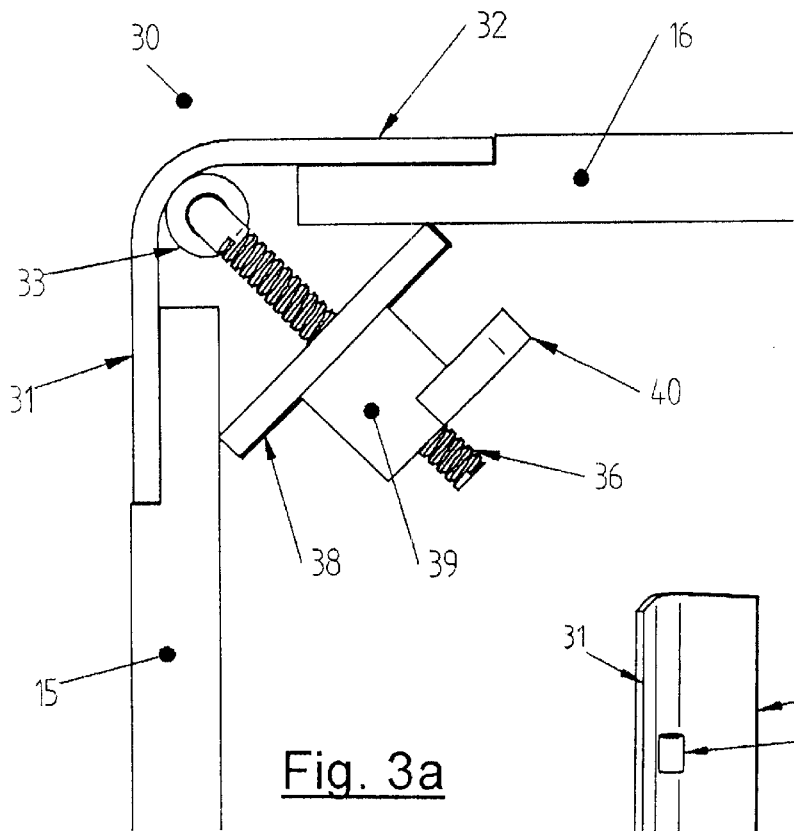
FIGS. 3A and 3B are plan and side views of a different device where the rod is releasably secured to the backing plate.
Figure 3B:
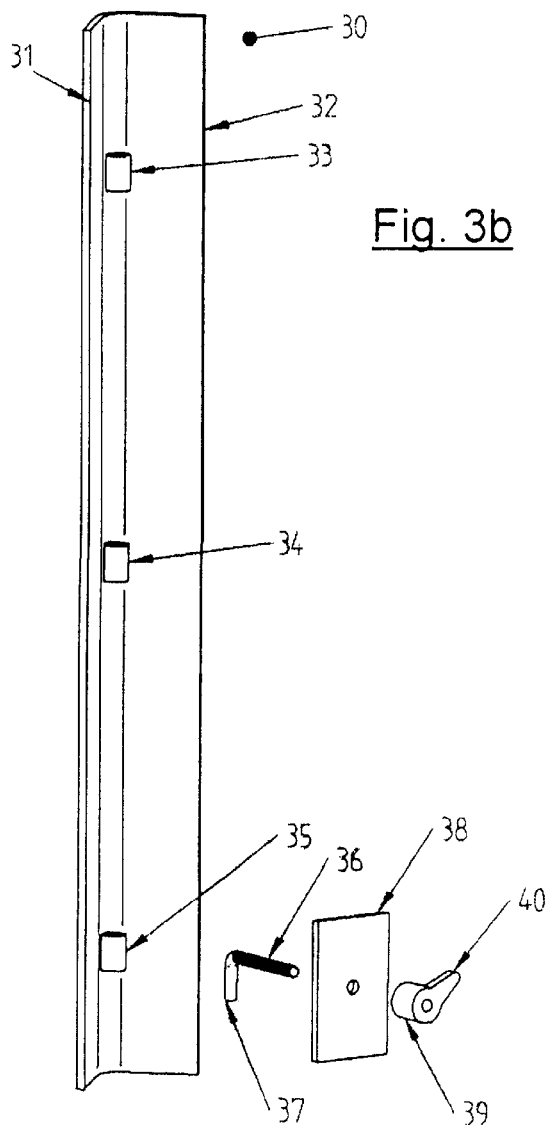

FIGS. 3A and 3B illustrate a clamping device similar to that described above, except that the rods are detachable from the backing plate. In this embodiment, backing plate 30 is again bent into a right angle to provide two flanges 31, 32 against which the form panels can sit. Backing plate 30 has a number of collars 33–35 welded to it. The collars can support a bent end 37 of a respective rod 36. A clamping plate 38 and a lock nut 39 is attached to the rod in a manner similar to that described above. In this embodiment, the rods 36 can be lifted out from engagement with the respective collar 33–35, and can be separately stored. Lock nut 39 has a wing 40 on it for easy rotation of the nut.

Figure 4:
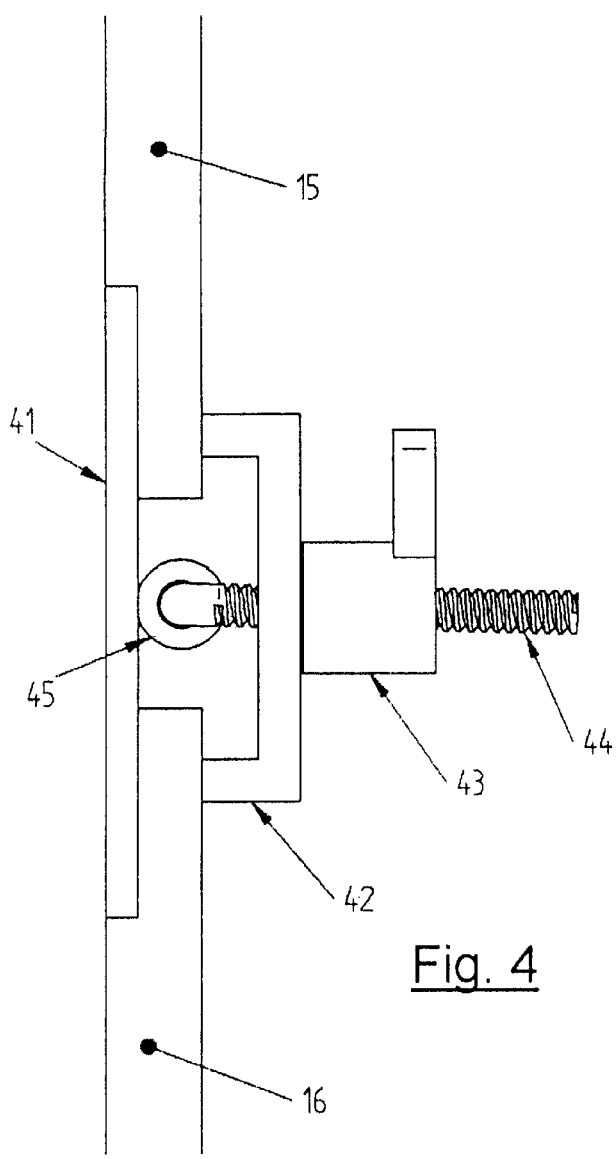
FIG. 4 is a plan view of a clamping device to clamp formwork panels in a straight line.

FIG. 4 illustrates a straight clamping system having a straight backing plate 41, a clamping plate 42, a clamp nut 43, a rod 44 which is releasably attached to a collar 45 which is welded to the backing plate 41.

Figure 5A:
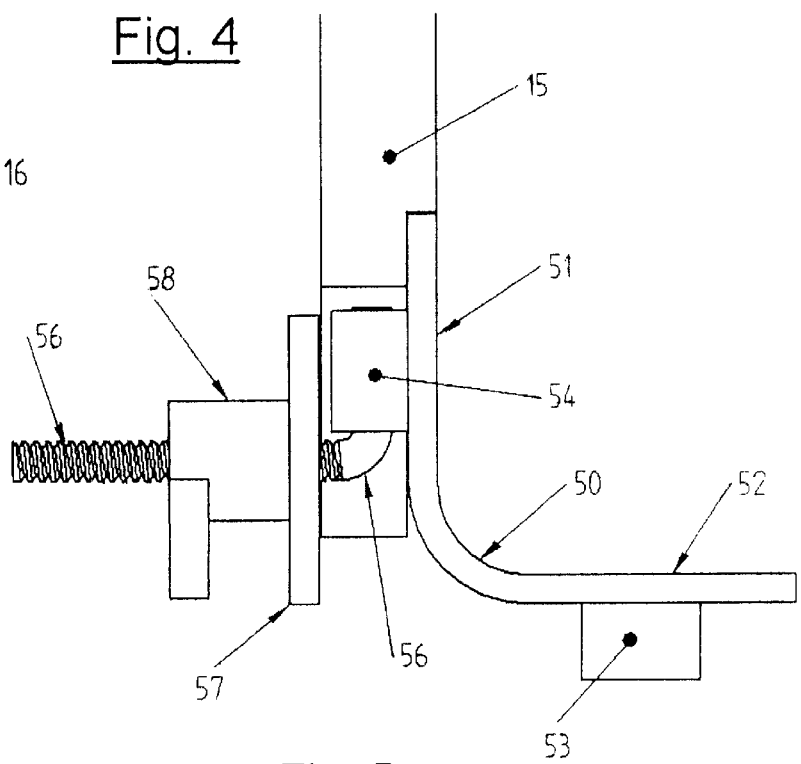
FIGS. 5A and 5B are plan and side views of a clamping device for external forms.
Figure 5B:
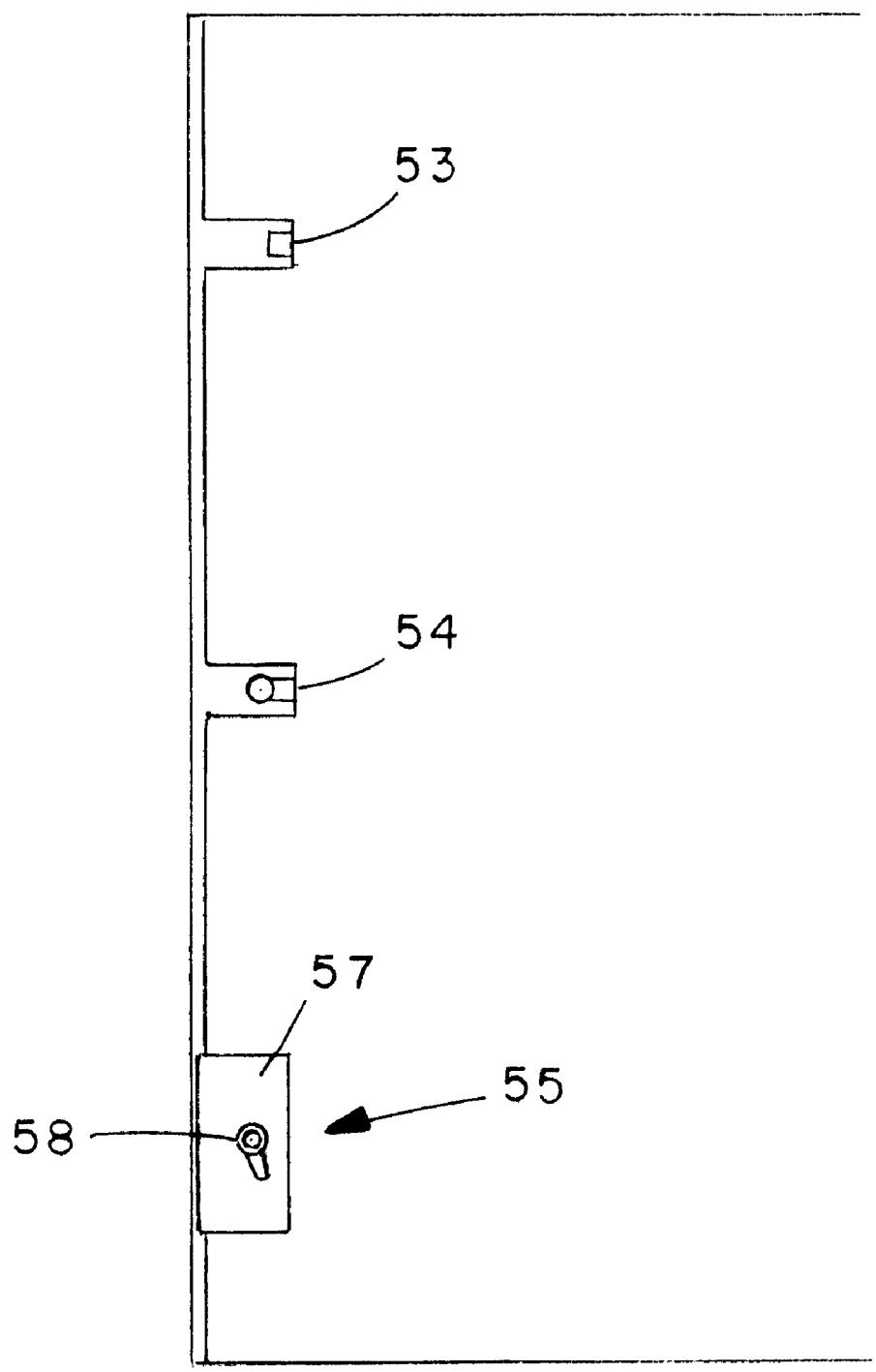

FIGS. 5A and 5B illustrate an external formwork system that consists of a backing plate having two flanges 51,52. Each flange has a number of external collars 53–55 (only two illustrated in FIG. 5A), which are the same type as described with reference to FIGS. 3A and 3B, and which releasably hold one end of a respective rod 56. The system further has a clamping plate 57 on each rod, and an associated lock nut 58.

The invention permits various numbers of fast clamping forms of various sizes and dimensions to be joined together to allow in situ concrete construction of many shapes and sizes and can be used to internal and external concreting formwork.

It should be appreciated that various other changes or modifications may be made to the embodiment described without departing from the spirit and scope of the invention.

What is claimed is:

1. A clamping device to clamp adjacent formwork panels in a fixed position relative to each other prior to a concrete pour, the clamping device having an elongate backing plate against which edges of the panels can be held, the backing plate having an outer face adapted to contact the poured concrete, and an opposed inner face, a plurality of linearly spaced apart collars rigidly attached to the inner face, each collar having a bore, a plurality of rods each having a first leg which can pass into said bore, and a second threaded leg which extends at an angle outwardly from the bore, such that the first leg can at least partially rotate within the bore to allow the second leg to pivot about a vertical axis, and clamping members attachable to and moveable along the rod between a clamping position where the clamping member clamps the formwork panels against the backing plate and the clamping member contacts the panels on or within an imaginary line extending between the edges of the two flanges of the backing plate, said imaginary line being straight, and a free position where the formwork panels can be removed from the device.

2. The device of claim 1, wherein the rods do not extend through the backing plate.

3. The device of claim 2, wherein the backing plate is elongate and comprises means for extending at least partially along an edge of each of said formwork panels.

4. The device of claim 3, wherein the rods are spaced along the backing plate.

5. The device of claim 4, wherein the rods are releasably attached relative to the backing plate.

6. The device of claim 5, wherein the clamping member is a clamping plate which has openings through which the rods pass to allow the clamping plate to slide freely along the rods between the clamping position and the free position.

7. The device of claim 6, wherein clamping nuts are provided behind the clamping plate and are threadably attached to the rods and that rotation of the nuts will cause the clamping plate to tightly clamp against the formwork panels.

8. The device of claim 7, wherein when the clamping plate is in the free position, the clamping plate, the attached rods and the nuts can be released from the backing plate as a single unit.

* * * * *